US008763767B2

(12) United States Patent
Goss et al.

(10) Patent No.: US 8,763,767 B2
(45) Date of Patent: Jul. 1, 2014

(54) ELECTRONIC PARKING BRAKE AND METHOD FOR CONTROLLING AN ELECTRONIC PARKING BRAKE

(75) Inventors: Stefan Goss, Brunn (DE); Alexander Kalbeck, Burglengenfeld (DE); Armin Sauer, Amstein (DE)

(73) Assignee: Continental Automotive GmbH, Hannover (DE)

( * ) Notice: Subject to any disclaimer, the term of this patent is extended or adjusted under 35 U.S.C. 154(b) by 938 days.

(21) Appl. No.: 11/571,704

(22) PCT Filed: Apr. 25, 2005

(86) PCT No.: PCT/EP2005/051839
§ 371 (c)(1),
(2), (4) Date: Jun. 28, 2007

(87) PCT Pub. No.: WO2006/003042
PCT Pub. Date: Jan. 12, 2006

(65) Prior Publication Data
US 2007/0240947 A1    Oct. 18, 2007

(30) Foreign Application Priority Data
Jul. 7, 2004  (DE) .................. 10 2004 032 899

(51) Int. Cl.
*B60L 7/00* (2006.01)
(52) U.S. Cl.
USPC .............. 188/158; 188/1.11 E; 188/1.11 L; 188/1.11 R; 188/72.1; 188/72.3; 188/72.8; 188/156; 188/157; 303/3; 303/11; 303/20; 303/89; 303/155; 701/70

(58) Field of Classification Search
USPC ...... 188/158, 1.11 R, 1.11 L, 1.11 E; 701/70, 701/78, 83, 36; 303/11
See application file for complete search history.

(56) References Cited
U.S. PATENT DOCUMENTS

| 4,362,053 A | * | 12/1982 | Barrett ........................... 73/121 |
| 6,000,507 A |   | 12/1999 | Böhm et al. ................... 188/158 |
| 6,522,967 B1 | * | 2/2003 | Pfeil et al. ....................... 701/70 |

(Continued)

FOREIGN PATENT DOCUMENTS

| DE | 195 36 694 A1 | 4/1997 | ............... B60T 8/32 |
| DE | 103 10 499 A1 | 9/2004 | ............. F02M 51/06 |

(Continued)

OTHER PUBLICATIONS

German Office Action for German Patent Application No. 10 2004 032 899.4 (3 pages).

(Continued)

*Primary Examiner* — Robert A Siconolfi
*Assistant Examiner* — San Aung
(74) *Attorney, Agent, or Firm* — King & Spalding L.L.P.

(57) ABSTRACT

In a method for controlling an electronic parking brake system and an electronic parking brake system, a travel-optimized method is used to achieve the released state of the parking brake system. When the parking brake is applied, travel-force values are detected and a plausibility check is run, the values being used to arrive at a first optimized position when the brake is released. If the residual force applied to the brake exceeds a threshold value, the parking brake is released even more until the value remains just under the threshold value or until a maximum defined release travel is achieved.

18 Claims, 6 Drawing Sheets

(56) References Cited

U.S. PATENT DOCUMENTS

| | | | |
|---|---|---|---|
| 6,663,195 B1 * | 12/2003 | Arnold | 303/122.03 |
| 6,802,401 B1 | 10/2004 | Böhm et al. | 188/158 |
| 2003/0036838 A1 * | 2/2003 | Pfeil et al. | 701/70 |
| 2003/0062228 A1 * | 4/2003 | Ichinose et al. | 188/72.3 |
| 2005/0212355 A1 * | 9/2005 | Godlewsky et al. | 303/20 |
| 2006/0043213 A1 | 3/2006 | Gerschwitz et al. | 239/102.2 |
| 2006/0131113 A1 | 6/2006 | Christof et al. | 188/72.1 |

FOREIGN PATENT DOCUMENTS

| | | | | |
|---|---|---|---|---|
| EP | 1 431 568 A2 | 6/2004 | | F02M 51/06 |
| EP | 1 482 569 A1 | 12/2004 | | H01L 41/053 |
| EP | 1 553 286 A1 | 7/2005 | | F02M 61/16 |
| JP | 2001225741 | 8/2001 | | B60T 13/74 |
| WO | 00/73114 A1 | 12/2000 | | B60T 7/10 |
| WO | 2004/022394 A1 | 3/2004 | | B60T 8/00 |
| WO | 2004/046543 A1 | 6/2004 | | F02M 61/12 |

OTHER PUBLICATIONS

International Search Report and Written Opinion for International Application No. PCT/EP2005/051839 (14 pages).
Japanese Office Action for Application No. 2007-519745 (17 pages).

* cited by examiner

ELECTRONIC PARKING BRAKE AND METHOD FOR CONTROLLING AN ELECTRONIC PARKING BRAKE

CROSS-REFERENCE TO RELATED APPLICATIONS

This application is a U.S. national stage application of International Application No. PCT/EP2005/051839 filed Apr. 25, 2005, which designates the United States of America, and claims priority to German application number DE 10 2004 032 899.4 filed Jul. 7, 2004, the contents of which are hereby incorporated by reference in their entirety.

TECHNICAL FIELD

The invention relates to a method for controlling an electronic parking brake, wherein a force control operation and a position control operation take place when the parking brake is released.

The invention also relates to an electronic parking brake, which can be released by a force control operation and a position control operation.

BACKGROUND

Electronic parking brake systems, also known as electronic, electrical and automatic parking brakes are increasingly replacing purely mechanical handbrakes in motor vehicles. The use of electronic parking brakes means that there is no need for the generally relatively large operating lever in the passenger space, with the result that the passenger space can be configured much more freely. Such a system is also much more user-friendly, as on the one hand the operator does not have to use a high level of force to secure or release the brake and on the other hand various functions, such as hill starts or releasing the brake when first starting after parking can be executed electronically and therefore also automatically. These advantageous features of an electronic parking brake system must however also be associated with a comparable or improved level of safety compared with the purely mechanical handbrake.

When controlling or in some instances regulating (here and throughout the document the term control must also be understood to include regulation) such a parking brake, by means of an electric motor transmission unit for example, there is generally a discrepancy between the position of the transmission and the force present at the brakes. This is due to the physical characteristics of the braking system and the force transfer device and is for example expressed in the form of hysteresis effects. In this context the term force transfer device should include the actuator and all parts which transfer forces to the brakes, as well as components on which the force of the actuator acts. As such unique assignment between the transfer position and brake force is difficult to achieve, a control operation is generally not just carried out by way of the transmission or engine position. A control operation can alternatively be carried out on the electronic parking brake by measuring the force at the force transfer device. Exclusive control or regulation by way of the force present at the force transfer device of the brake is however out of the question for safety reasons, as errors at the force transfer device and the above-mentioned hysteresis effects have to be taken into account. A combined force-travel controller is generally deployed with electronic parking brake systems for such reasons.

According to the prior art an "Apply parking brake-release parking brake" cycle takes place as follows: Starting from a start position, the parking brake is tensioned until a predefined force is achieved. This must be achieved within a predetermined travel with corresponding tolerances. During release the system then covers a permanently predetermined travel in the release direction based on the tension position. The position then achieved is determined as the new start position. This takes account of a changing travel-force characteristic due to wear of the brake device to a certain degree. If this characteristic changes further however, a residual force may be present in an undesirable manner after the parking brake has been released for example.

This can be remedied by opening the parking brake until no residual force is present, and then additionally covering a predetermined travel in the release direction. This method has the disadvantage that the brake has to cover unnecessarily long travel paths, as hysteresis effects generally influence the residual force values.

SUMMARY

The object of the invention is to eliminate the disadvantages of the prior art and in particular to provide a method for controlling an electronic parking brake or to provide an electronic parking brake, having optimized travel paths.

In a method for controlling an electronic parking brake, wherein when the parking brake is released, a force control operation and a position control operation take place, the following steps are performed:

during release of the parking brake, moving said parking brake first to a predetermined first position in the release direction in the context of a position control operation, determining the first position of the parking brake, wherein during application of the parking brake a position, in which a force commences, is detected in the context of a force measurement, and the first position is determined as a position further on in the release direction based on this position, performing a force measurement after the predetermined first position has been achieved and a further movement of the parking brake in the release direction to a second position can take place as a function of the result of this force measurement in the first position.

BRIEF DESCRIPTION OF THE DRAWINGS

The invention is described below by way of an example with reference to the accompanying drawings based on preferred embodiments.

DETAILED DESCRIPTION

The invention builds on the generic method in that when the parking brake is released, it is first moved to a predetermined first position in the release direction in the context of a position control operation, the first position of the parking brake is determined in that when the parking brake is applied, a position, in which a force commences, is detected in the context of a force measurement, and the first position is determined as a position further on in the release direction based on this position and once the predetermined first position is achieved, a force measurement takes place and a further movement of the parking brake can take place to a second position in the release direction as a function of the result of this force measurement in the first position. By detecting a position in the context of a force measurement when applying the parking brake, the first position can be adopted directly without further force measurement when releasing the parking brake. The first position can be determined at any time, for example when applying the parking brake or even dynamically when releasing the parking brake. This allows direct arrival at a position that is probably suitable as an end position. Should further release of the parking brake be necessary after determining the force present in this position, a further movement can be carried out in the release direction to a second position. This allows further optimization of the adjustment travel of the brake, as further movement only takes place when an undesirable degree of force is present. Determination of the forces present can take place both during arrival at a position or shortly before the end of the intended movement as well as only after the end of the movement when at a standstill. The decision whether the further second position is to be activated can also be taken during movement to the first position and therefore the second position can be arrived at in a continuous manner without stopping in the first position. During evaluation of the determined force present, said force can for example also be compared with a threshold value or with one or more value ranges, which can also be adapted to conditions over time. Predetermination of the first position based on a position in which a force commences also allows travel-optimized compensation for the above-mentioned hysteresis effects where there is a corresponding knowledge of the system. The method thus combines force control and position control for a parking brake in an optimizing manner.

In one embodiment of the method provision can be made for the first position to be predetermined during every apply and/or release process of the parking brake. This allows particularly precise control of the release point of the parking brake, thereby further reducing the possible travel path.

In another embodiment provision can be made for the first position and/or the positions detected in the context of a force measurement to be verified by means of a plausibility check. Such a procedure increases the safety of the method significantly, as the reliability of the measurement and position values can be checked in this manner.

According to a further embodiment of the method, provision can be made for a force measurement to take place when the parking brake is released after achieving any position, possibly corresponding to a release state of the parking brake, and for a further movement of the parking brake to take place in the release direction as a function of the result of the force measurement. This allows an iterative release of the parking brake in fixed or variable position steps as a function of the result of a force measurement, said position steps possibly being able to be adapted depending on the configuration of the braking system. In this instance too the movement can be interrupted after achieving the corresponding positions for force measurement or can continue in a continuous manner, until the result of the force measurement is within the desired value range.

The method can also be configured such that when the parking brake is released, a further movement of the parking brake takes place in the release direction, if the force measurement supplies a result that is not equal to zero. This means that the parking brake is released as long as a non-vanishing residual force is present or the residual force is outside a value range, assumed around a zero value. When this residual force is equal to zero or less than or equal to a corresponding limit value, the parking brake should be considered to be fully released and the release process can end.

The method can also be configured in that the parking brake is moved by an actuator and the force measurement takes place at the force transfer device. If a braking device is moved by the parking brake with the aid of an actuator, the force measurement can take place at the force transfer device, thus providing fast and direct feedback of a force measurement value to the method.

The invention is based on the generic device in that when the parking brake is released, it can first be moved in the context of a position control operation to a predetermined first position in the release direction, the first position of the parking brake can be determined, in that a position (KEP), in which a force (FR) commences, is detected when the parking brake is applied in the context of a force measurement and the first position is determined as a position further on in the release direction based on said position and after the predetermined first position has been achieved, a force measurement can take place and a further movement of the parking brake in the release direction to a second position can take place as a function of the result of said force measurement in the first position. This allows the advantages and particular features of the method also to be achieved in the context of a device. This also applies to the particularly preferred embodiments of the device set out below.

The device can be further developed in that the first position can be predetermined during any apply and/or release process of the parking brake.

A similarly further development results in that the first position and/or the positions detected in the context of a force measurement can be verified by means of a plausibility check.

One embodiment of the device also results in that when the parking brake is released, a force measurement can take place after any position, possibly corresponding to a released state of the parking brake, has been achieved and in that a further movement of the parking brake can take place in the release direction as a function of the result of the force measurement.

In another embodiment, when the parking brake is released, a further movement of the parking brake takes place in the release direction, if the force measurement supplies a result that is not equal to zero.

In another embodiment, the parking brake has a force transfer device and the force measurement takes place at the force transfer device.

The invention also relates to a service brake with such a device.

The invention is based on the knowledge that the release process of an electronic parking brake can be optimized by recording travel-force information when applying the brake. When the brake is released, this information can be used to arrive at a first optimized position. If an unwanted residual force should then still be present, the brake can be released until said residual force vanishes, optionally in a number of steps.

FIGS. 1*a*-1*d* show flow diagrams to describe a method according to an embodiment. The method starts with step S01, with which the electronic controller or regulator of the parking brake system starts to implement the command "Apply parking brake". To this end, as shown in decision S02, a check takes place to determine the force currently present at the force transfer device. If this is smaller than what is known as a force reference FR, the actuator is moved in the apply direction (step S03). When the force present at the force transfer device achieves or exceeds the value FR (decision S04), it is checked whether the current force value is within a typical range and within a range specified by the force deployment point (KEP) determined by the previous cycle (decision S05). If the result of this plausibility check is negative, the apply process can be terminated with an error report (step S06) and/or an error can be reported. If the result of the check is positive, the method continues with step S07. The current actuator position is stored as a new force deployment point (KEP) here. After this step the method continues with the decision S08, in which a further check is carried out to determine the force currently present. This check also takes place, if, during the check to determine the force present at the force transfer device in decision S02, the method determines a value, which is greater than FR, and has initiated the movement of the actuator in the apply direction with step S09, as in step S03. If the force present exceeds or achieves a second limit value, the target force apply TFA in decision S08, in step S10 the current actuator position is recorded as a temporary force cut-off point.

Otherwise the current actuator position is checked in relation to a maximum value (decision S11). If this is not exceeded, the method continues with the decision S08, otherwise the method is terminated with an error report at this point in step S12.

With the recording of the force cut-off point it is checked in decision S13 whether the value KAP is within a typical range and/or a range specified by a previous cycle. If the result is negative, the method is terminated at this point with an error report in step S14, otherwise the temporary force cut-off point is stored as the new force-cut off point KAP to be used (step S15). The parking brake is now in the locked or tensioned state (step S16).

If the controller or regulator issues the command "Release parking brake", representing driver intent or triggered by an automatic function, as shown in step S17, the position of the actuator is controlled or checked. As shown in decision S18, the position is compared in respect of achieving the KEP. If this is not achieved, in step S19 the actuator starts to move in a direction counter to the apply direction, namely the release direction. This movement continues, until it is determined in the check on the current actuator position in decision S20 that the KEP has been achieved. The movement of the actuator then continues, still in the release direction, in step S21. However no absolute position is arrived at here, the actuator is simply moved in relation to the KEP through the release position travel RPT. At this point the method also starts, when achievement of the KEP is determined in step 18. After covering the RPT, the force present at the force transfer device is again determined, as shown in decision S22. If this is below a limit value referred to as the target force release TFR and within a typical range, the method is terminated in step S23. Otherwise it is checked whether the actuator position has achieved a maximum value (decision S24). If this is not the case, the actuator is moved through a further additional step in the release direction (step S25) and the force present is checked again in step S22. Otherwise the method is terminated at this point in step S26 with an error report. The method repeats the steps S22, S24 and S25 in an iterative manner, in other words it moves the actuator in the release direction and compares the force present there with the limit value TFR, until the residual force drops below the limit value or a maximum release travel has been covered. The method is thereby terminated.

Provision can also be made for the method to perform a calibration run. To this end the method starts in step S30, with which the calibration run starts. The actuator is first moved in the release direction (step S31). At the same time in decision S32 it is determined whether the actuator has achieved a zero position or a calibration mark. If this is not the case, if a maximum travel path has been exceeded (decision S33), the method is terminated in step S34 with an error report. Otherwise the method continues with the decision S32. Once the calibration mark or zero position is achieved, in step S35 the current position of the actuator is stored as the zero position.

The method then goes through steps, which correspond to the steps S03 to S08, S11 and S12 described above in relation to FIG. 1a and are therefore not explained again.

Steps S05, S06 and S12 are thereby correspondingly adapted and are therefore referred to as S05', S06' and S12'. After the presence of TFA has been identified at the force transfer device in decision S08, in step S36 the current position is stored as the force cut-off point (KAP).

It is further checked in decision S37 whether the KAP value is within a typical range and/or a range specified by a previous cycle. Should this not be the case, the method is terminated in step S38 with an error report.

The method continues in step 39 and releases the actuator to the calculated release position. The force present at the force transfer device is checked there (decision S40). If this is not within a typical range, the method is terminated in step S41 with an error report, otherwise the system is in a calibrated state with S42.

Absolute positioning can therefore take place for the points KEP and KAP and this can also be used for example for the plausibility check of the values determined in the further apply processes.

Figure 1A:
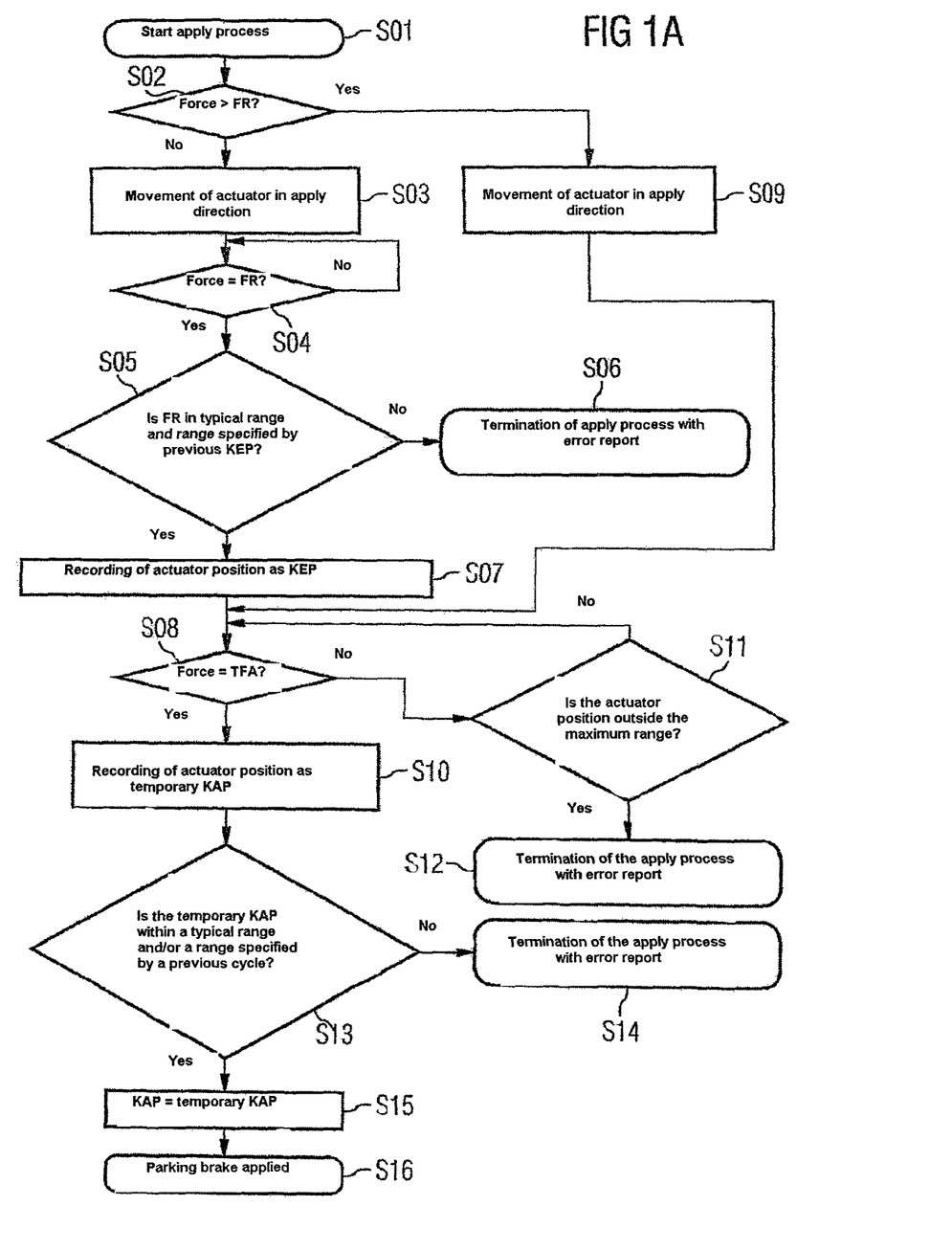
FIGS. 1a-1d show flow diagrams to describe an inventive method.
Figure 1B:
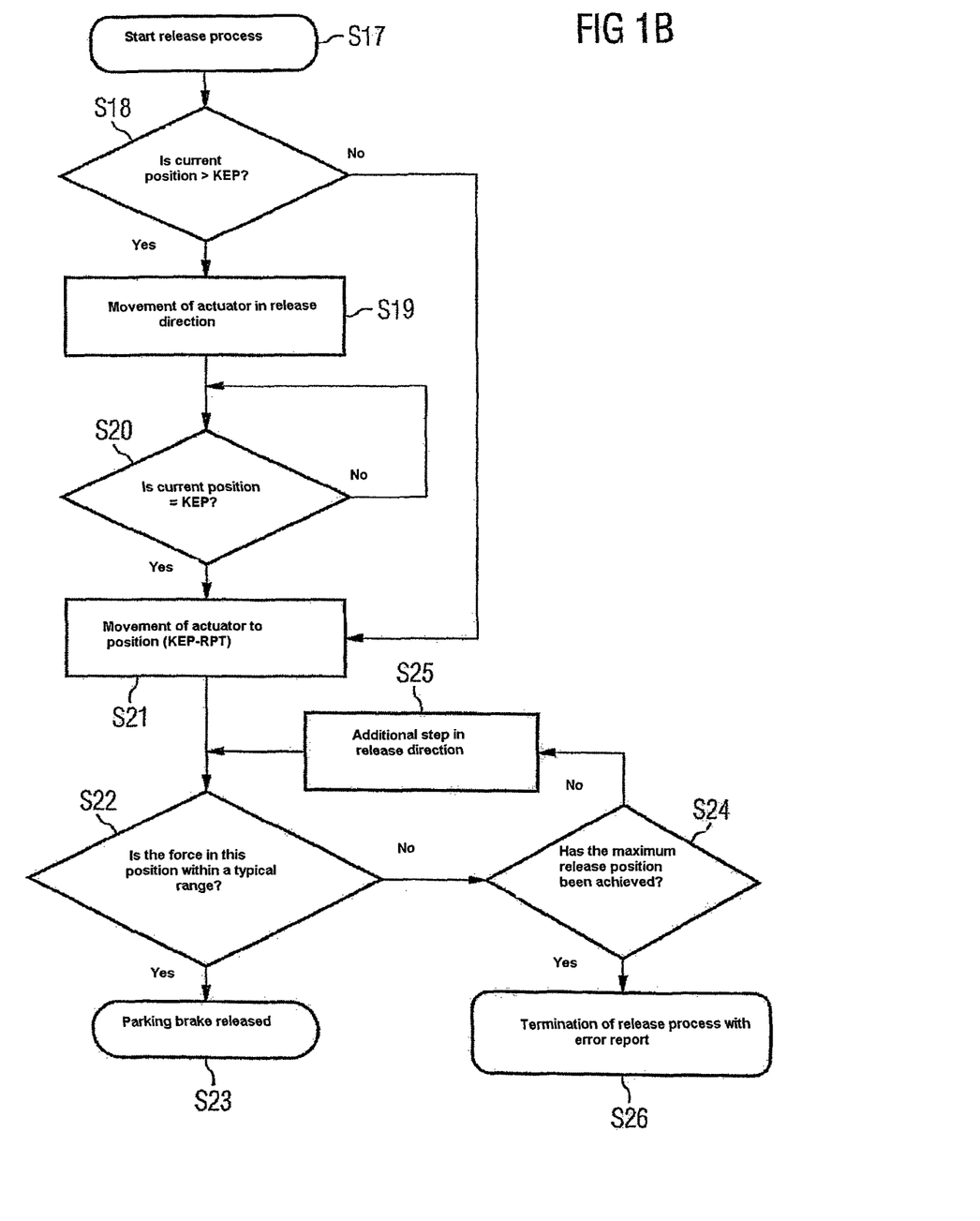
Figure 1C:
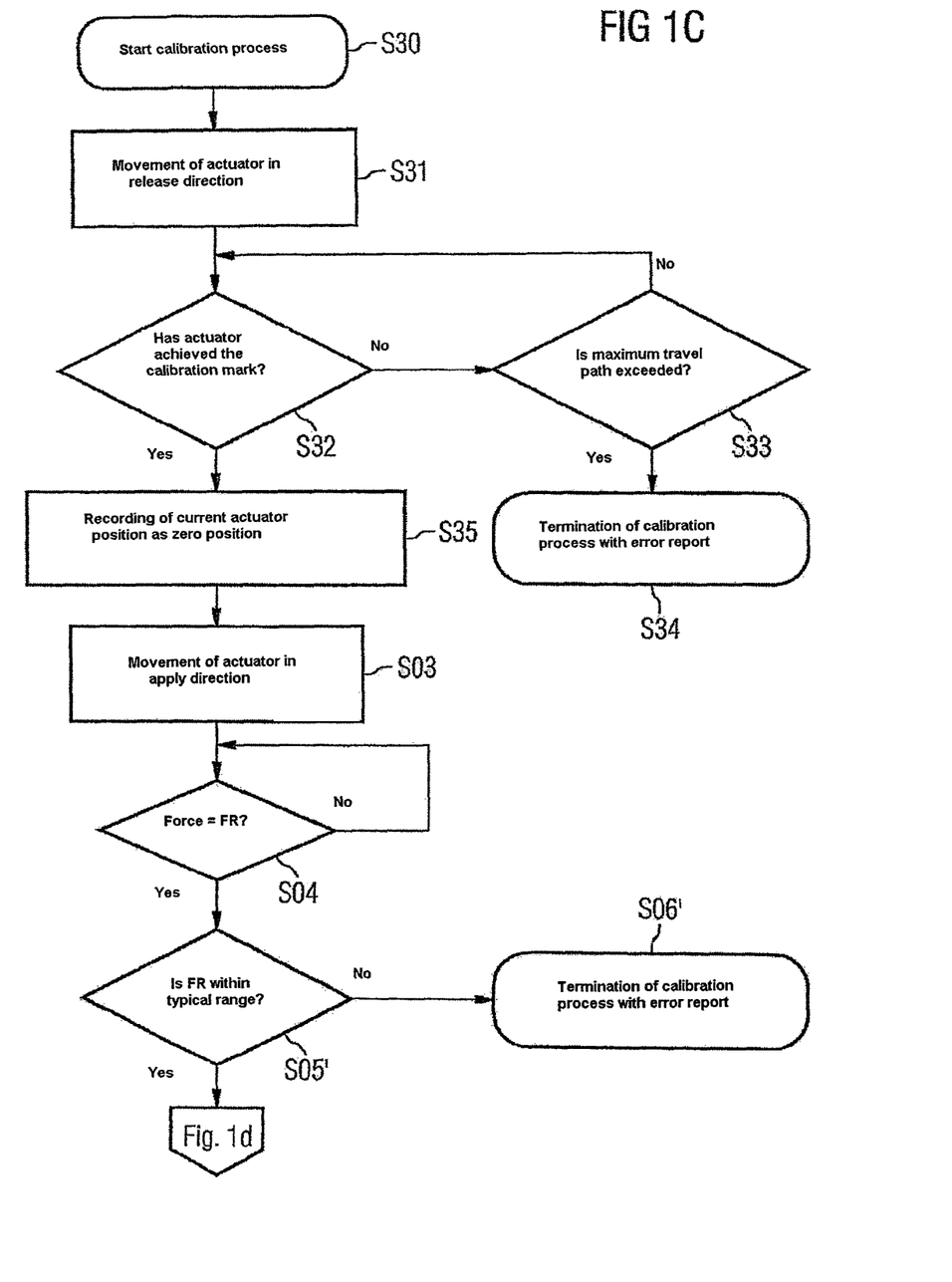
Figure 1D:
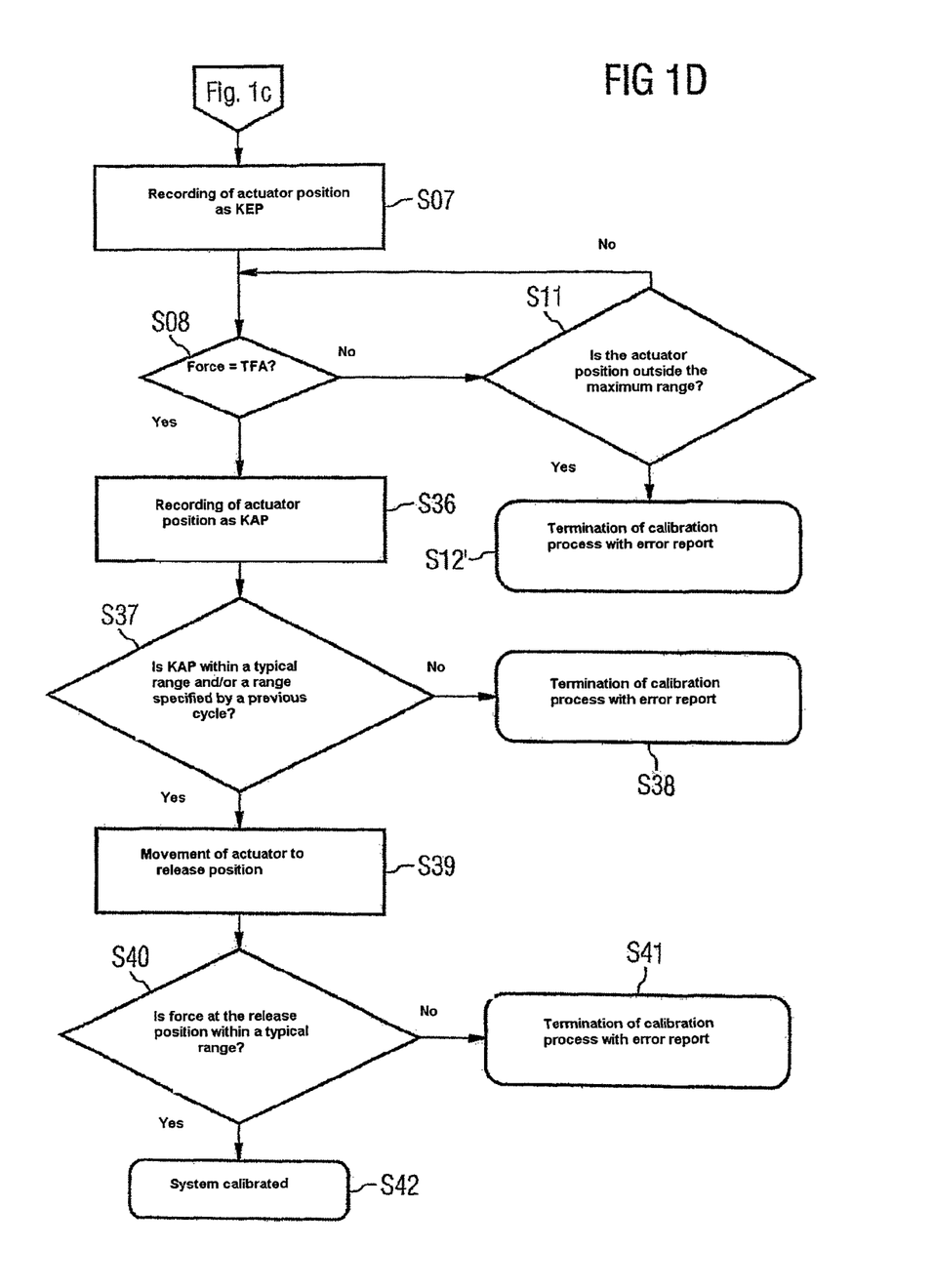
Figure 2A:
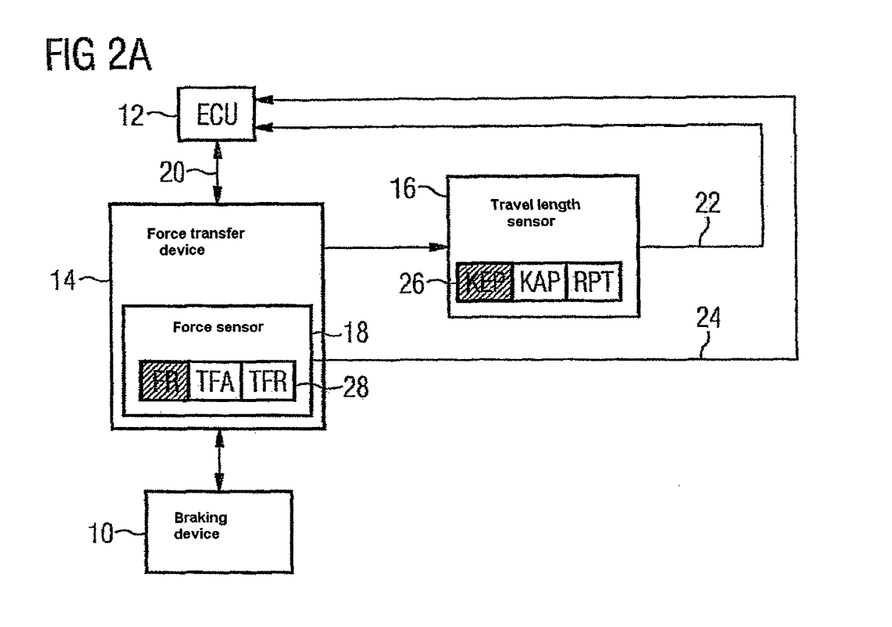
FIGS. 2a-2c show function block diagrams to describe an inventive device in different states.
Figure 2B:
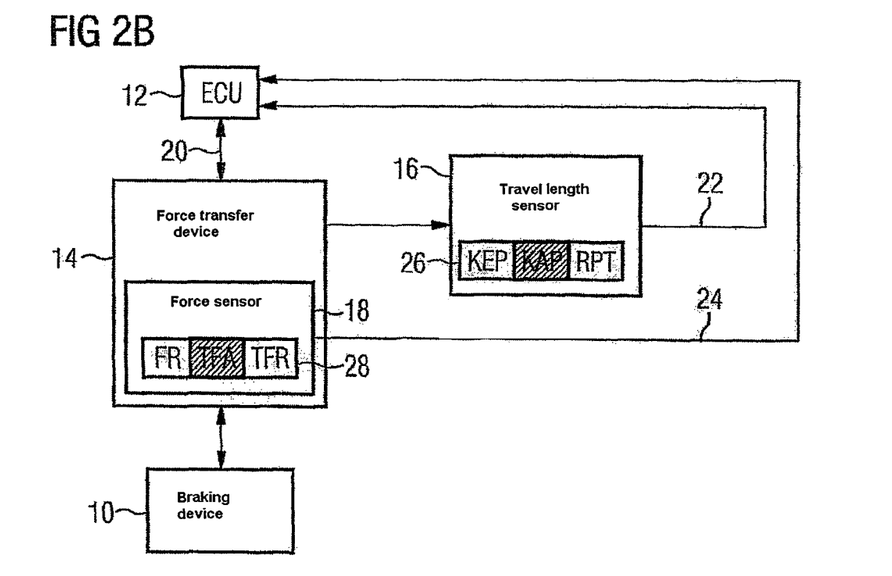

FIGS. 2a-2b show function block diagrams to describe a device in different states. In addition to the electronic, mechanical and in some instances hydraulic components known from the prior art, combined here under the term braking device 10, the embodiment shown has an electronic control unit (ECU) 12, a force transfer device 14 as well as a travel length sensor 16 and a force sensor 18. In this context, as in the descriptive part, the term force transfer device includes an actuator, all parts which transfer forces to the brakes, as well as components, on which the force of the actuator acts. The force sensor 18 can be attached to any suitable point both within this force transfer device 14 and also outside it, in some instances even in the braking device 10. The electronic control unit 12 is connected by way of the signal line 20 to the force transfer device 14, which has a mechanical active connection to the braking device 10. The travel length sensor 16 detects a position signal supplied by the force transfer device 14 and forwards this as position information 22 to the electronic control unit 12. Similarly the force sensor 18 generates a measurement signal 24 corresponding to the force currently present at the force transfer device or the braking device and outputs this similarly to the electronic control unit 12. Both the travel length sensor 16 and the force sensor 18 are provided with a symbolic display 26 or 28, which displays different selected signals. The signals KAP, KEP and RPT are emphasized at the travel length sensor 20 and the display 28 of the force sensor 18 emphasizes the signals FR, TFA and TFR. The embodiment shown in FIGS. 2a, 2b and 2c has identical components and reference characters, differing only in the signals 20 and 22 supplied by the sensors 16 and 18, corresponding to different actuator positions and therefore different states of the parking brake.

In FIG. 2a the electronic controller 12 has issued the command to the actuator of the force transfer device 14 to move in the apply direction, in other words the parking brake is to be applied. In the state currently shown the force reference FR is present at the force transfer device 14. The travel sensor 16 correspondingly supplies the signal 22 representing the force deployment point (KEP) to the electronic control unit 12, which records this travel length value, in so far as the plausibility check has been carried out successfully.

In FIG. 2b the position is achieved for the locked state of the brake. What is known as the target force apply TFA is thereby present at the force transfer device 14, the amount of which is forwarded as signal 24 to the electronic control unit 12 by means of the force sensor 18. This force amount is now correlated to the current actuator position with the aid of the travel length sensor 16. To this end the electronic control unit 12 first buffers the travel length signal 22 as a temporary force cut-off point, compares it with a typical value range and/or a value range specified by a previous cycle in the context of a plausibility check and, if the check is successful, stores it as the new force cut-off point (KAP) to be used.

Figure 2C:
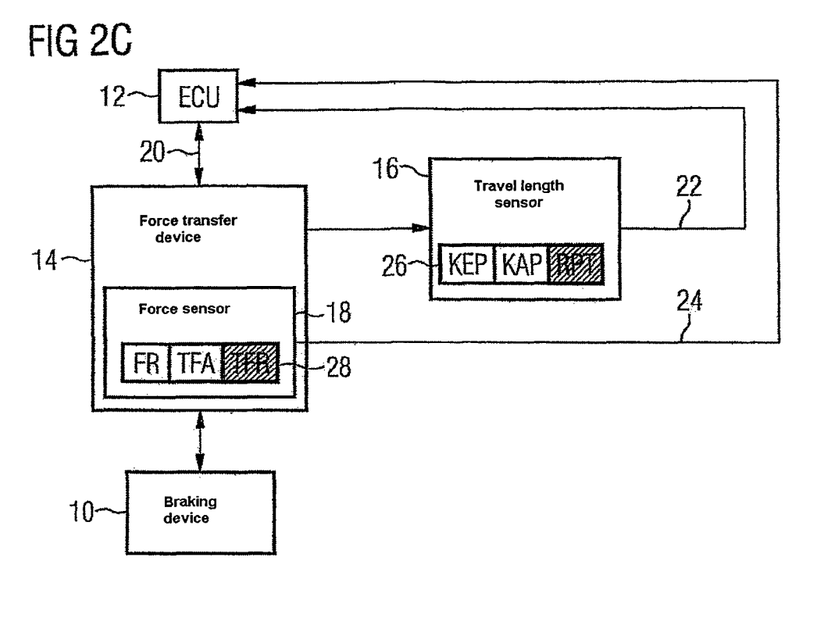

FIG. 2c shows a state of the electronic parking brake, which is assumed during release of the parking brake. The actuator of the force transfer device 14 is thereby first moved again by way of a signal 20 from the electronic control unit 12 until it achieves the force deployment point (KEP), corresponding to the state shown in FIG. 2a. Once the KEP has been achieved, the actuator of the force transfer device 14 is moved from there through the release position travel RPT further on in the release direction. The travel length sensor 16 correspondingly displays achievement of the RPT as signal 22. The electronic control unit 22 detects this signal 22 and compares the force signal 24 supplied by the force sensor 18 with a limit value, the target force release (TFR). As the target force release TFR is actually currently present at the actuator of the force transfer device 14, the state shown in FIG. 2c represents the released state of the parking brake.

Figure 3:
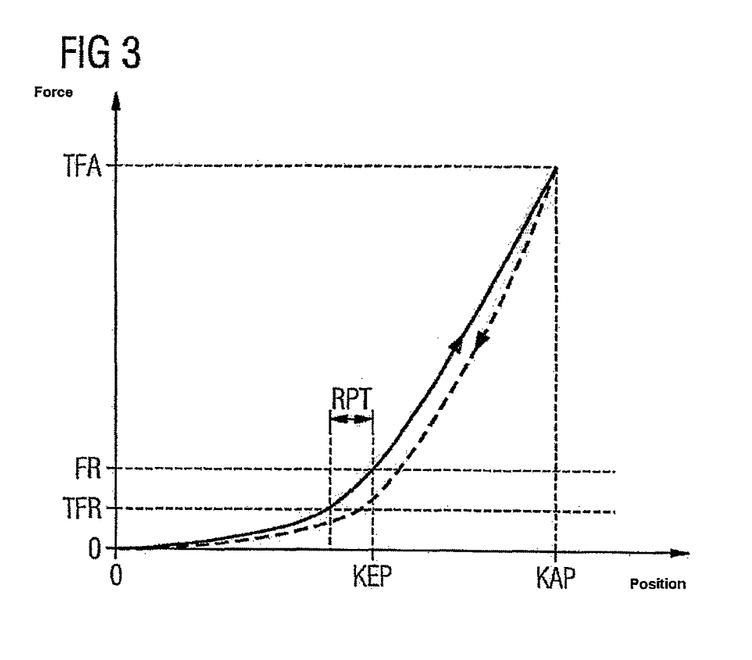
FIG. 3 shows a force-position diagram.

FIG. 3 shows a force-position diagram. It illustrates the movements of the actuator occurring with the method and with a device and an example of the force present at the actuator. A position corresponding to the current actuator position is plotted on the abscissa of the diagram, with the ordinate showing the force present at the force transfer device. The force deployment point (KEP) and the force cut-off point (KAP) as well as the release position travel (RPT) are shown as position values, while the target force release (TFR), force reference (FR) and target force apply (TFA) are shown as force values. The continuous curve with an arrow represents an example of the assignment of the actuator position to the force currently present at the force transfer device during application of the parking brake, while the broken curve with an arrow pointing in the opposite direction represents the assignment of the actuator position to the force currently present at the force transfer device during release of the parking brake.

During a movement of the actuator, starting from the zero position, in direction KEP, the force-position function follows the continuous line. When the force present at the force transfer device achieves the value FR, the current actuator position is determined as the KEP. During further application of the parking brake, the force present at the force transfer device achieves the value TFA, again following the continuous line. The position KAP is assigned to this force value. During release of the parking brake, the force assigned to the position now follows the broken line. The position KEP determined during application of the parking brake is first arrived at. From there the actuator is moved through the relative travel length RPT further on in the release direction. The physical conditions of the braking system mean that the broken line generally runs below the continuous line, due to the hysteresis effects mentioned above. For this reason the force present at the force transfer device when the position KEP is achieved is smaller than FR and in some instances greater than TFR but would not achieve the value FR immediately with an immediately following application of the parking brake. At the position determined by the relative travel length RPT it is now checked whether the force present at the force transfer device is smaller than TFR. This is so in FIG. 3, so the method is terminated at this point. Should the force present at the force transfer device still exceed the value TFR, the actuator would be moved further in the release direction, until the force present at the force transfer device is below the value TFR.

A method for controlling or regulating an electronic parking brake system and an electronic parking brake system are disclosed, with a travel-optimized method being used to achieve the released state of the parking brake. As the parking brake is applied, travel-force values are determined and a plausibility check carried out thereon, said travel-force values then being used to ensure that a first optimized position is arrived at when the brake is released. If the residual force then present exceeds a limit value, the parking brake is released further, until it drops below the limit value or a release travel defined as a maximum is covered.

The features of the invention disclosed in the above description, the drawings and the claims can be essential to the realization of the invention both individually and in any combination.

What is claimed is:

1. A method for controlling an electronic brake, comprising the steps of:
   during application of the brake:
      moving the brake in an application direction until a predetermined force associated with the brake is achieved,
      determining and recording a first position of the brake at which the predetermined force associated with the brake is achieved, and
      further moving the brake in the application direction from the first position to a locked position,
   during release of the brake, moving said brake first from the locked position to the first position recorded during the application of the brake, and then moving the brake a particular distance further in the release direction to a second position, such that the second position is based on the first position recorded during the application of the brake,
   performing an initial force measurement after the second position has been achieved, comparing the force measurement in the second position with a predetermined release force, and determining whether to move the brake further in the release direction based on the result of the comparison of the force measurement in the second position with the predetermined release force, and
   performing at least one further movement of the brake in the release direction and performing an additional force measurement after each further movement, if the force measurement in the second position is greater than the predetermined release force,
   wherein the initial force measurement is the first force measurement performed during the release of the brake, such that no force measurements are performed during the release of the brake until the brake passes the first position associated with the predetermined force and reaches the second position based on, and further in the release direction than, the first position.

2. The method according to claim 1, wherein the first position is re-determined during each application of the brake.

3. The method according to claim 1, wherein the first and second positions are verified by means of a plausibility check.

4. The method according to claim 1, wherein the predetermined release force is zero.

5. The method according to claim 1, wherein the brake is moved by an actuator and the force measurement takes place at a force transfer device.

6. An electronic brake, comprising:
means to move the brake in an application direction until a predetermined force associated with the brake is achieved,
means to determine and record a first position of the brake at which the predetermined force associated with the brake is achieved, and
means to move the brake further in the application direction to a locked position,
means to first move the brake in a release direction from the locked position to the first position recorded during the application of the brake, and then moving the brake a particular distance further in the release direction to a second position, such that the second position is based on the first position recorded during the application of the brake,
means for performing an initial force measurement, after the second position has been achieved, means for comparing the result of this force measurement in the second position with a predetermined release force, and means for determining whether to move the brake further in the release direction based on the result of the comparison of the force measurement in the second position with the predetermined release force, and
means for performing at least one further movement of the brake in the release direction and performing an additional force measurement after each further movement, if the force measurement in the second position is greater than the predetermined release force,
wherein the initial force measurement is the first force measurement performed during the release of the brake, such that no force measurements are performed during the release of the brake until the brake passes the first position associated with the predetermined force and reaches the second position based on, and further in the release direction than, the first position.

7. The electronic brake according to claim 6, wherein the first position is re-determined during each application of the brake.

8. The electronic brake according to claim 6, wherein the first and second positions are verified by means of a plausibility check.

9. The electronic brake according to claim 6, wherein the predetermined release force is zero.

10. The electronic brake according to claim 6, wherein the brake has a force transfer device and force measurement takes place at a force transfer device.

11. An electronic brake, comprising:
an electronic control unit,
a force transfer device coupled with the electronic control unit and with a braking device,
a travel length sensor coupled with the force transfer device, and
a force sensor coupled with the force transfer device,
wherein, during application of the brake:
the brake is moved in an application direction until a predetermined force associated with the brake is achieved,
a first position of the brake at which the predetermined force associated with the brake is achieved is determined and recorded, and
the brake is further moved in the application direction from the first position to a locked position,
wherein, during release of the brake, said braking device is first moved by the force transfer device in a release direction from the locked position to the first position recorded during the application of the brake, and then further moved by the force transfer device a particular distance in the release direction to a second position, such that the second position is based on the first position recorded during the application of the brake,
wherein an initial force measurement by the force sensor is performed after the second has been achieved, wherein the force measurement in the second position is compared with a predetermined release force, and wherein a determination of whether to move the brake further in the release direction is made based on the result of the comparison of the force measurement in the second position with the predetermined release force, and
wherein at least one further movement of the brake in the release direction and corresponding force measurement is performed if the force measurement in the second position is greater than the predetermined release force,
wherein the initial force measurement is the first force measurement performed during the release of the brake, such that no force measurements are performed during the release of the brake until the brake passes the first position associated with the predetermined force and reaches the second position based on, and further in the release direction than, the first position.

12. The electronic brake according to claim 11, wherein the first position is re-determined during each application of the brake.

13. The electronic brake according to claim 11, wherein the first and second positions are verified by means of a plausibility check.

14. The electronic brake according to claim 11, wherein the predetermined release force is zero.

15. The electronic brake according to claim 11, wherein the brake is moved by an actuator and the force measurement takes place at the force transfer device.

16. A method for controlling an electronic parking brake, comprising the steps of:
during application of the parking brake:
moving the parking brake in an application direction until a predetermined force associated with the parking brake is achieved,
determining and recording a first position of the parking brake at which the predetermined force associated with the parking brake is achieved, and
further moving the parking brake in the application direction from the first position to a locked position,
during release of the parking brake, moving said parking brake first from the locked position to the first position recorded during the application of the parking brake, and then moving the parking brake a particular distance further in the release direction to a second position, such that the second position is based on the first position recorded during the application of the parking brake, and
performing an initial force measurement after the second position has been achieved, comparing the force measurement in the second position with a predetermined release force, and determining whether to move the parking brake further in the release direction based on the result of the comparison of the force measurement in the second position with the predetermined release force, and performing at least one further movement of the brake in the release direction and performing an additional force measurement after each further movement, if the force measurement in the second position is greater than the predetermined release force, wherein the initial force measurement is the first force measurement performed during the release of the brake, such that no force measurements are performed during the release of the brake until the brake passes the first position associated with the predetermined force and reaches the second position based on, and further in the release direction than, the first position.

17. The electronic brake according to claim 6, wherein the electronic brake is an electronic parking brake.

18. The electronic; brake according to claim 11, wherein the electronic brake is an electronic parking brake.

* * * * *